United States Patent [19]
Tomiyoshi et al.

[11] Patent Number: 5,269,389
[45] Date of Patent: Dec. 14, 1993

[54] HYDRAULIC STEERING SYSTEM FOR ARTICULATED VEHICLE

[75] Inventors: Yasumasa Tomiyoshi; Toshiro Nozawa, both of Kawagoe, Japan

[73] Assignees: Kabushiki Kaisha Komatsu Seisakusho; Komatsu Mec Kabushiki Kaisha, both of Tokyo, Japan

[21] Appl. No.: 793,394
[22] PCT Filed: Jul. 13, 1990
[86] PCT No.: PCT/JP90/00910
§ 371 Date: Jan. 10, 1992
§ 102(e) Date: Jan. 10, 1992
[87] PCT Pub. No.: WO91/01239
PCT Pub. Date: Feb. 7, 1991

[30] Foreign Application Priority Data

Jul. 14, 1989 [JP] Japan ................. 1-180397

[51] Int. Cl.$^5$ .................. B60D 1/32; B62D 5/09
[52] U.S. Cl. .................. 180/139; 180/235; 280/432; 280/446.1
[58] Field of Search ........ 280/432, 446.1, 492; 180/135, 139, 235

[56] References Cited

U.S. PATENT DOCUMENTS

| | | | |
|---|---|---|---|
| 4,081,054 | 3/1978 | Yates | 180/139 |
| 4,106,792 | 8/1978 | Schultz et al. | 280/432 |
| 4,365,685 | 12/1982 | Ratskó et al. | 180/139 |
| 4,688,818 | 8/1987 | Grassmuck | 280/432 |
| 4,763,916 | 8/1988 | Ratskó et al. | 280/432 |
| 5,020,618 | 6/1991 | Nagao | 180/132 |

FOREIGN PATENT DOCUMENTS

| | | |
|---|---|---|
| 3808866 | 10/1988 | Fed. Rep. of Germany . |
| 59-81256 | 1/1982 | Japan . |
| 60-261779 | 6/1984 | Japan . |
| 61-143263 | 6/1986 | Japan . |
| 63-301178 | 5/1987 | Japan . |

*Primary Examiner*—Mitchell J. Hill
*Attorney, Agent, or Firm*—Flynn, Thiel, Boutell & Tanis

[57] ABSTRACT

A fully hydraulic steering system for a vehicle having a front frame and a rear frame coupled to each other by an articulating pin, the steering system coupling a steering unit operated by a wheel to steering cylinders, for turning the vehicle body. The steering system comprises: a sensor to detect a turning angle of the steering wheel; a sensor to detect an articulating angle of the vehicle body; a controller to compare outputs from these two sensors to drive a wheel position correcting solenoid valve according to the difference between the outputs; a pilot-type diverting valve to allow wheel position correcting oil to branch from a switch pump circuit to the wheel position correcting solenoid valve; and a safety valve to close a drain port of the pilot type diverting valve only when the driver performs steering with the wheel so that the pilot-type diverting valve feeds correcting oil to the wheel position correcting solenoid valve.

3 Claims, 11 Drawing Sheets

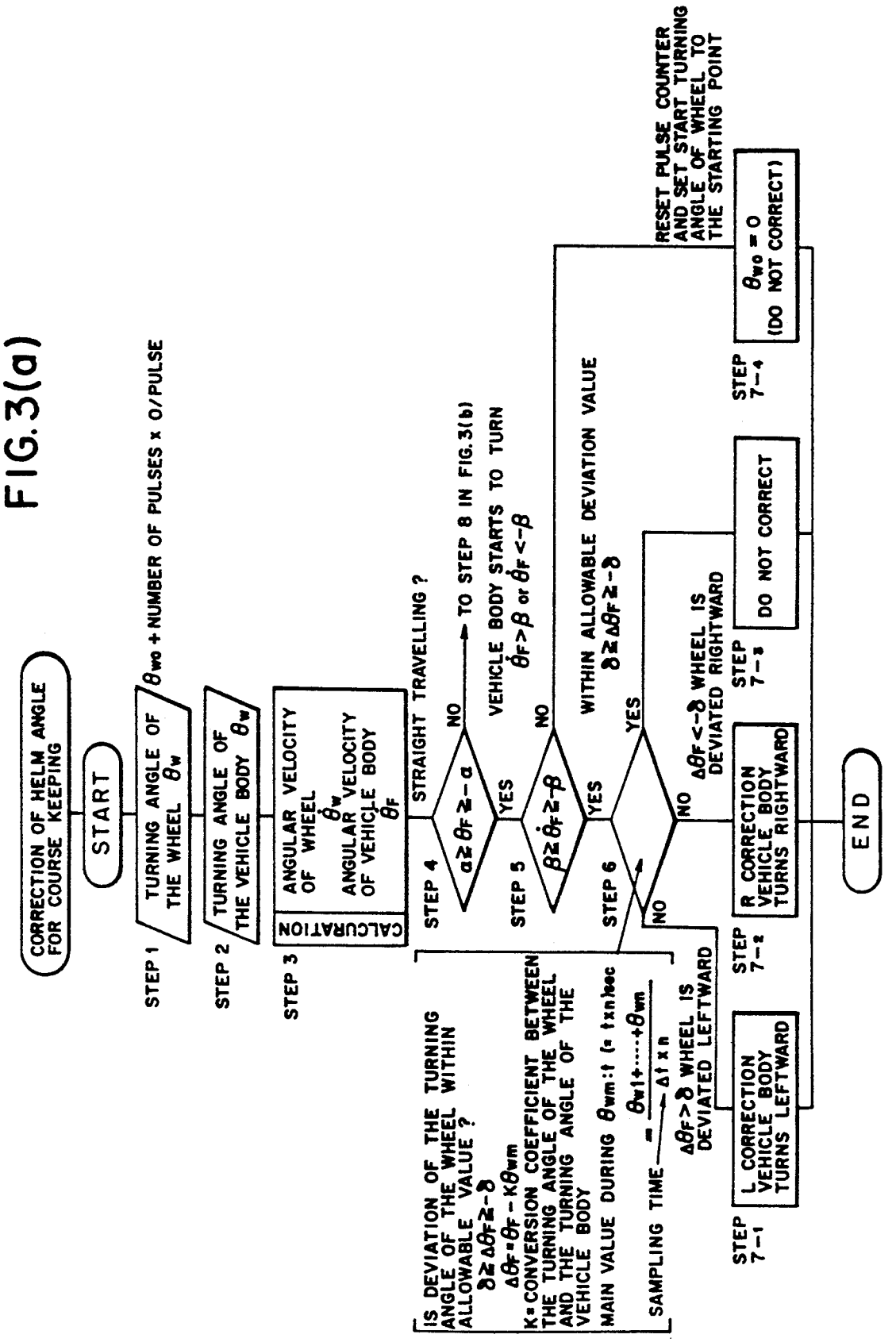

HYDRAULIC STEERING SYSTEM FOR ARTICULATED VEHICLE

TECHNICAL FIELD

The present invention relates to a pilot type fully hydraulic steering system having a steering device of a vehicle such as a wheel loader, fork lift truck and is capable of preventing the deterioration of a steering operation property of a wheel due to deviation of a wheel position when a vehicle body travels straight and of correcting deviation of the wheel position, which is caused by frequent turning of the wheel.

BACKGROUND

A conventional pilot type fully hydraulic steering system will be described with reference to FIG. 13.

In the same figure, if a wheel H is turned from a straight position $H_2$ to a left turning position $H_1$ or to a right turning position $H_3$, a directional control valve b is changed over from a straight position $b_2$ to a left turning position $b_3$ so that an oil under pressure supplied through a hydraulic pump A is supplied to a metering unit c and returned to the directional control valve b. In the case of left turning, a directional control valve d of a steering valve is switched over to a left turning position $d_1$ so that the oil under pressure from hydraulic pumps M (steering pump) and N (switching pump) is supplied to a head side $D_h$ of a left steering cylinder D and a bottom side $E_b$ of a right steering cylinder E. In the case of right turning, the oil under pressure is supplied to a bottom side $D_b$ of the left steering cylinder D and a head side $E_h$ of the right steering cylinder E so that vehicle bodies F and G are turned relative to each other, whereby the steering operation is made. The oil under pressure, which is returned from left and right steering cylinders D and E, is returned to a tank T through the directional control valve b. Designated at L is a working machine valve $P_1$ and $P_2$, which are denoted at two dotted and one chain line and show that the directional control valve b and the metering unit c are operated by the wheel H.

In the conventional pilot type fully hydraulic steering system, it is necessary to correct the deviation of the wheel position since the turning angle of the wheel and the turning angle of the vehicle body do not always accord with each other at the same ratio because of leakage of the oil under pressure inside each hydraulic device, indifference of the steering valve to a pilot oil and revolution of turning of the steering wheel.

Accordingly, the present invention is to eliminate the drawbacks of the conventional pilot type fully hydraulic steering system and to provide a wheel position correcting device capable of eliminating such a drawback that the steering of the wheel is deteriorated due to the gradual deviation of the wheel position when the vehicle body travels straight.

SUMMARY OF THE INVENTION

To achieve the above object, the present invention provides a wheel position correcting device for pilot type fully hydraulic steering system provided with a hydraulic circuit to connect a steering unit operated by a wheel to steering cylinders for turning the vehicle body, characterized in comprising a sensor to detect a turning angle of the wheel, a sensor to detect a turning angle of the vehicle body, a controller to compare outputs (such as voltage and pulse) from these two sensors to drive a wheel position correcting solenoid valve according to the difference between the outputs, a pilot type diverting valve to allow wheel position correcting oil to branch from a switch pump circuit to a wheel position correcting solenoid valve, and a safety valve to close a drain port of the pilot type diverting valve only when the driver performs steering with the wheel so that the pilot type diverting valve feeds correcting oil to the correcting valve.

With such an arrangement, it is possible to correct the deviation of the wheel position by supplying a wheel position correcting oil from the wheel position correcting solenoid valve to the steering cylinder toward the position for correcting the deviation of the wheel or by draining part of the oil discharged from the steering valve if there is deviation between the target turning angle of the vehicle body when it travels straight and the estimate turning angle of the same when it returns to travel straight in case that wheel is changed to turn in full range of the turning angle of the vehicle body (ranging from the leftward maximum turning angle to the rightward maximum turning angle).

Furthermore, according to the present device, although the wheel position correcting oil is supplied to pipings between the steering unit and the steering cylinders for correcting the deviation of the wheel when the steering valve is indifferent to the pilot oil flow, this device can assure the safety by providing a safety valve (correcting circuit closing valve) which stops the wheel position correcting oil by a flow divider to prevent the drawback caused by the continuous supply of the correcting oil when the steering wheel is not turned in case of the trouble of the controller or the wheel position correcting solenoid valve.

DETAILED DESCRIPTION

The present invention will be described with reference to drawings.

Figure 1:
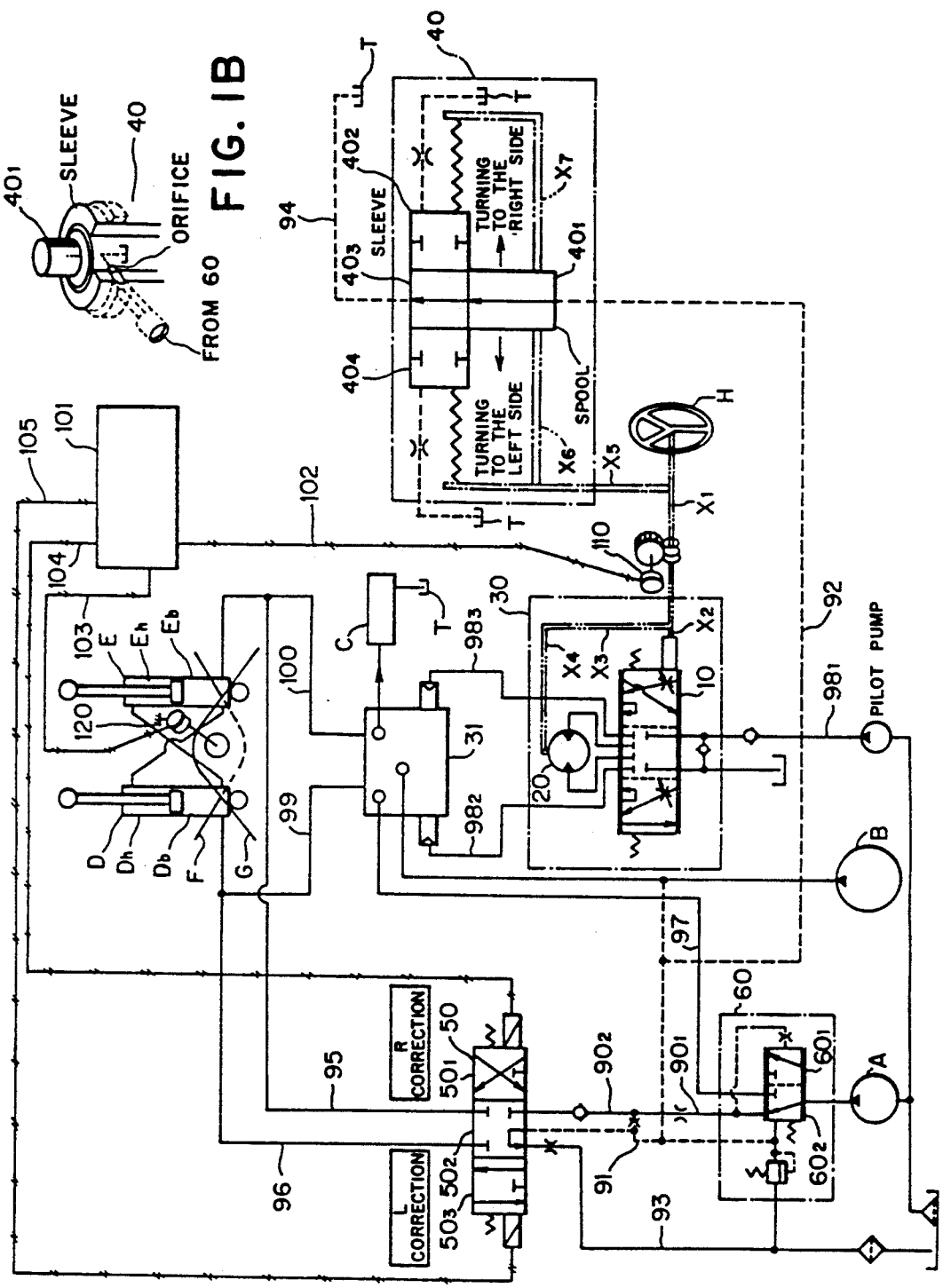
FIG. 1A is a view explaining a pilot type fully hydraulic steering system provided with a wheel position correcting device according to the present invention.
FIG. 1B is a fragmentation perspective view of the correcting circuit closing valve according to the present invention.
Figure 13:
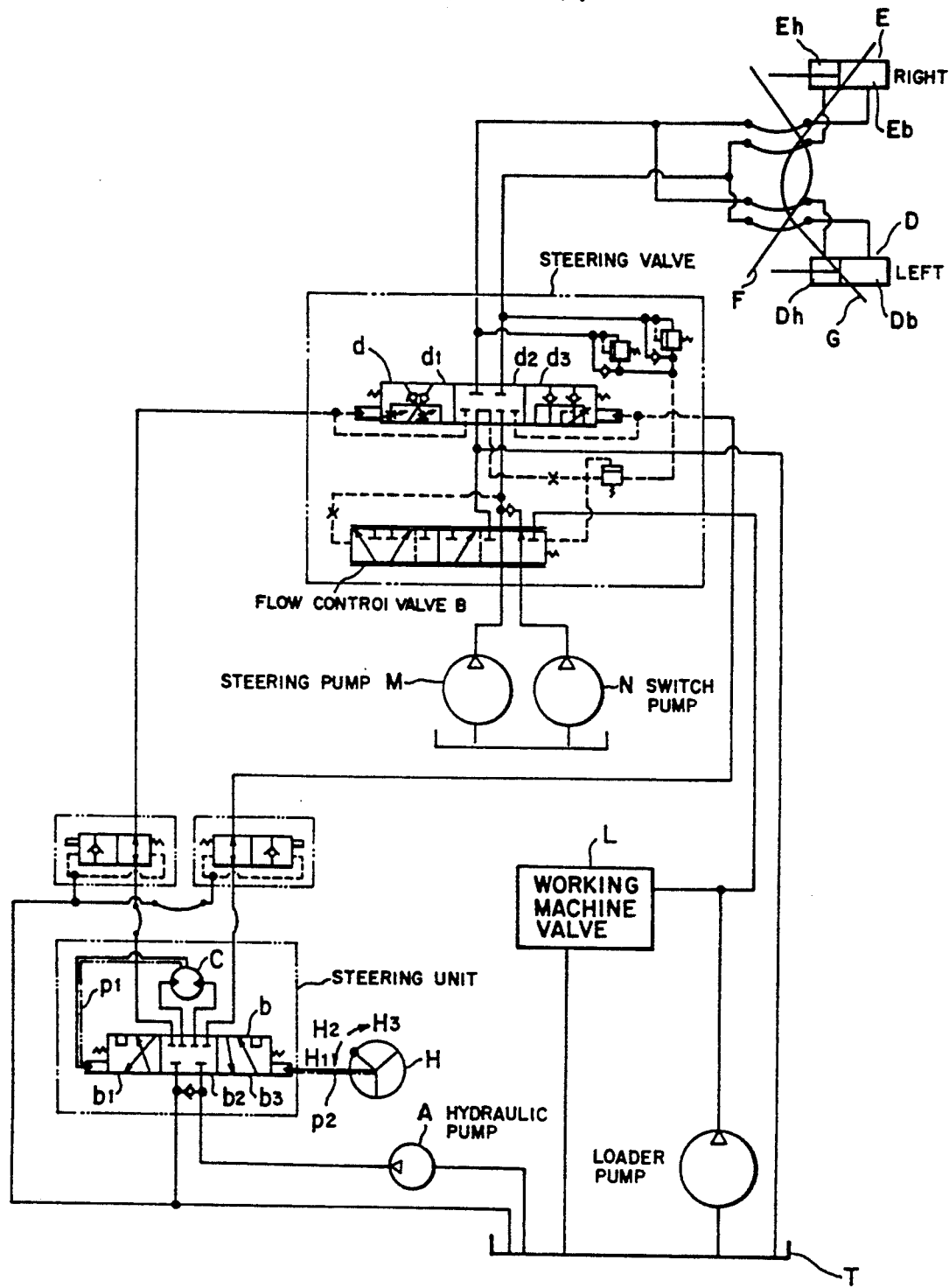

FIG. 1 is a view explaining a pilot type fully hydraulic steering system provided with a wheel position correcting device according to the present invention in which the same devices as those as illustrated in FIG. 13 are denoted at the same numerals and detailed explanations thereof are omitted.

In FIG. 1, a wheel H, a directional control valve 10, a metering unit 20 (a steering unit 30 is a general name of a combination of the directional control valve 10 and the metering unit 20), a correcting circuit closing valve 40 are connected by two rows of two dotted one chain lines $X_1$, $X_2$, $X_3$, $X_4$,$X_5$$X_6$, and $X_7$ and respectively operated by the wheel H.

Designated at 50 is a wheel position correcting solenoid valve, 60 is a pilot type diverting valve, $90_1$, $90_2$, 91, ..., 100 are oil pipings, 101 is a controller, 102, 103, 104, 105 are electric wirings, 110 is a sensor to detect a turning angle of the wheel and 120 is a sensor to detect a turning angle of the vehicle body.

An operation of the correcting circuit closing valve 40 will be described first. The correcting circuit closing valve 40 supplies a wheel position correcting oil to the wheel position correcting solenoid valve 50 only when the driver performs steering with the wheel, thereby correcting the wheel position. When the wheel is not turned, the wheel position correcting oil is not supplied. Accordingly, it is possible to prevent the vehicle body from turning against the intention of the driver.

More in detail, when the wheel H is not turned, a spool $40_1$ of the correcting circuit closing valve 40 and sleeves $40_2$, $40_3$, $40_4$ are respectively centered by springs disposed at both ends of the sleeves while the oil under pressure supplied from the pilot type diverting valve 60 through a pilot hydraulic circuit 92 of the pilot type diverting valve 60 is drained from a small hole of the spool $40_1$ and a small hole of the sleeve $40_3$ so that spools $60_1$ and $60_2$ of the pilot type diverting valve 60 are positioned at the position of the spool $60_1$ by the oil under pressure from a hydraulic piping $90_1$. Consequently, substantially all of the oil under pressure discharged from the pump A excepting the small amount of oil which is drained from the pilot hydraulic circuit 92 are supplied to a steering oil flow control valve 31 through a hydraulic piping 97. Accordingly, the wheel position is not corrected at this time even if the wheel position correcting solenoid valve 50 is positioned at an R correction position $50_1$ or an L correction position $50_3$.

That is, it is possible to perform steering with the wheel even if it is troubled while the wheel position correcting solenoid valve 50 is positioned at the R correction position $50_1$ or the L correction position $50_3$.

Figure 3B:
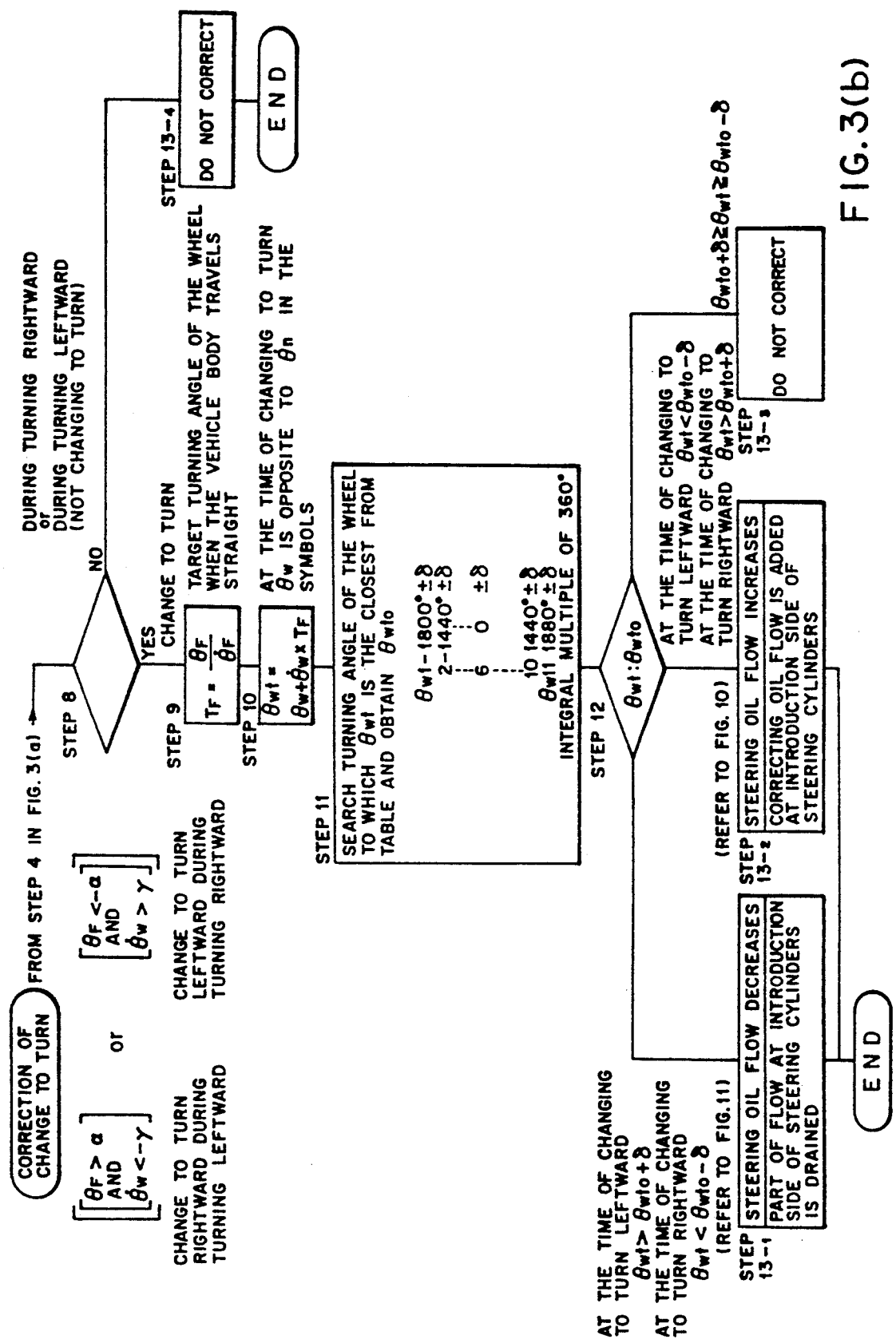

An operation of the correcting circuit will be described with reference to control flowcharts of a controller 101 as illustrate in FIGS. 3(a) and (b).

Figure 4:
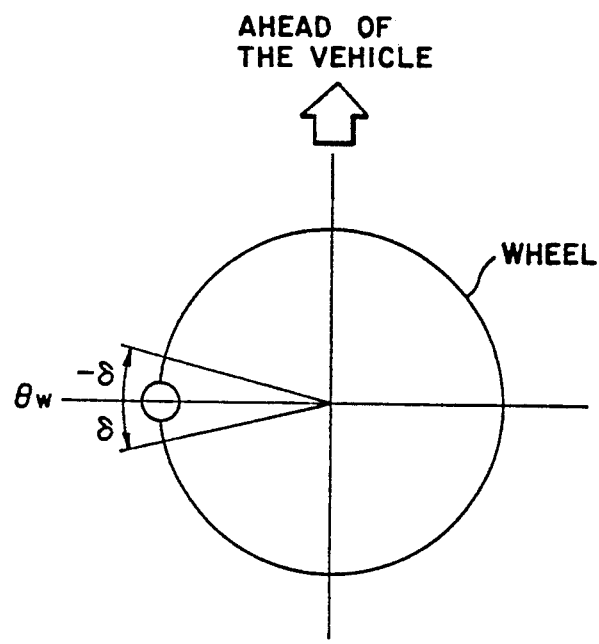
FIGS. 4 to 9 are views of assistance in explaining operations of the controller as illustrated in the flowcharts in FIGS. 3(a) and (b)

Step 1: (refer to FIG. 4) A turning angle $\theta_w$ of the wheel is detected by the sensor 110 and the detected value thereof is supplied to the controller 101.

Figure 5:
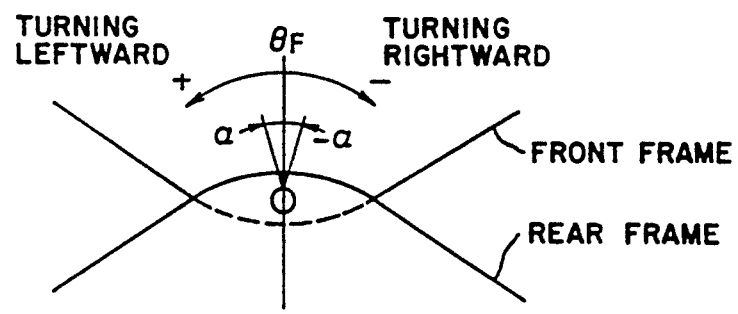

Step 2: (refer to FIG. 5) A turning angle $\theta_F$ of the vehicle body is detected by the sensor 120 and supplied to the controller 101.

Step 3: The controller 101 calculates an angular velocity $\dot\theta_w$ of the wheel and angular velocity $\dot\theta_F$ of the vehicle body is calculated.

Step 4: The controller 101 judges that the turning angle $\theta_F$ is within the straight travelling value of the vehicle body or not (assuming that judging value representing that the vehicle body travels straight or not is denoted at $\pm\alpha$, turning left is denoted at + and turning right is denoted at −). If the expression of $\alpha \geq \theta_F \geq -\alpha$, is established, the controller 101 judges that the vehicle body travels straight and the program goes to Step 5.

If the expression of $\theta_F > \alpha$ or the expression of $\theta_F < -\alpha$ is established, the program goes to Step 8.

Step 5: The controller 101 judges that the vehicle body starts to turn or not (assuming that judging value representing that the vehicle body turns or not is denoted at $\pm\beta$, turning left is denoted at + and turning right is denoted at −).

If the expression of $\beta \geq \theta_F \geq -\beta$, is established, the controller 101 judges the possibility of helm angle for course keeping, the program goes to Step 6.

If the expression of $\theta_F > \beta$ or of $\theta_F < -\beta$, is established, the controller 101 judges that the wheel is not in the helm angle but turned, the program goes to Step 7-4.

Step 6: The controller 101 judges that the turning angle of the wheel at the helm angle is within allowable deviation value or not (deviation turning angle of the wheel is $\pm\delta$, leftward deviation is denoted at +, rightward deviation is denoted at −).

If the expression of $\Delta\theta_F > \delta$, is established, the program goes to Step 7-1.

If the expression of $\Delta\theta_F < -\delta$, is established, the program goes to Step 7-2.

If the expression of $\delta \geq \Delta\theta_F \geq -\delta$, is established, the program goes to Step 7-3.

Figure 6:
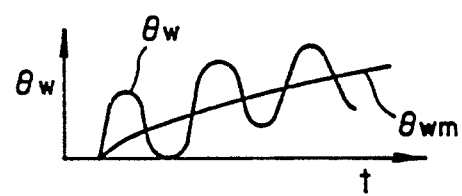

The expression of $\Delta\theta_F = \theta_F - k\theta_{wm}$ is established, where $\theta_{wm}$ is a mean value during time t ($= \Delta t \times n$) sec. $\Delta t$ is a sampling time (refer to FIG. 6).

Step 7-1: L correction (the wheel position correcting solenoid valve is switched over to turn the vehicle body leftward and the wheel position correcting oil is supplied).

Step 7-2: R correction (the wheel position correcting solenoid valve is switched over to turn the vehicle body rightward and the wheel position correcting oil is supplied).

Step 7-3: Correction is not made.

Step 7-4: A pulse counter is reset and set the start turning angle $\theta_{wo}$ of the wheel to 0.

The above is the helm angle correction.

A correction of change to turn will be described hereinafter.

Step 8: The controller 101 judges that the wheel is changed to turn or not. If the expression of $\theta_F > \alpha$ and of $\theta_w < -\gamma$ are established, or if the expression of $\theta_F < -\alpha$ and of $\theta_w > \gamma$ are established, the controller 101 judges that the wheel is now changing to turn, the program goes to Step 9.

If the expression of $\alpha > \theta_F > -\alpha$ or $\gamma > \theta_w > -\gamma$ is established, the program goes to Step 13-4.

Step 9: The controller 101 calculates the Time $T_F$ required for the vehicle body to return to the straight travelling, which is obtained by the following expression.

$$T_F = \frac{\theta_F}{\dot\theta_F}$$

Step 10: The controller 101 estimates the turning angle $\theta_{wt}$ of the wheel when the vehicle body returned to the straight travelling.

$$\theta_{wt} = \theta_w + \dot\theta_w \times T_F$$

(where the symbols $\theta_w$ and $\dot\theta_w$ are reversed to each other at the time of changing to turn)

Step 11: The controller 101 selects the turning angle of the wheel where $\theta_{wt}$ is the closest (an integral multiple of 360°). For example, the turning angle of the wheel is stored in a memory by 360° and the turning angle which is closest to $\theta_{wt}$ is selected and assumed to be $\theta_{wto}$.

Step 12: The controller 101 compares $\theta_{wt}$ and $\theta_{wto}$ and judges the necessity of correction and the direction of the correction. If the expression of $\theta_{wt} > \theta_{wto} + \delta$ is established at the time of changing to turn the left or the expression of $\theta_{wt} < \theta_{wto}$ is established at the time of changing to turn the right, the program goes to Step 13-1.

If the expression of $\theta_{wt} < \theta_{wto} - \delta$ is established at the time of changing to turn the left or the expression of $\theta_{wt} < \theta_{wto} + \delta$ is established at the time of changing to turn the right, the program goes to Step 13-2.

If the expression of $\theta_{wto} + \delta \geq \theta_{wt} \geq \theta_{wto} - \delta$ is established, the program goes to Step 13-3.

Figure 7:
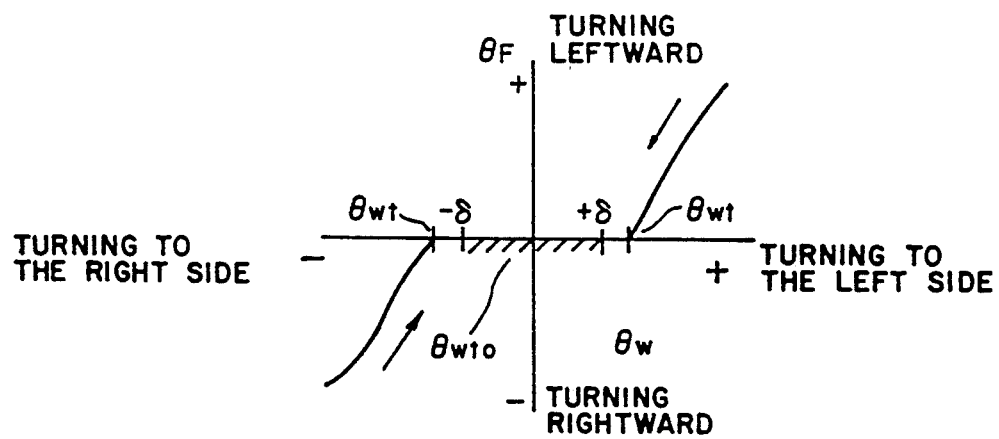

Step 13-1: Part of the steering oil flow (discharged oil flow from the steering valve) is drained from the wheel position correcting valve 50 so that the amount of changing to turn the wheel is increased and kept to change to turn (the wheel is more turned compared with the amount of turning of the vehicle body) (refer to FIG. 7).

Figure 8:
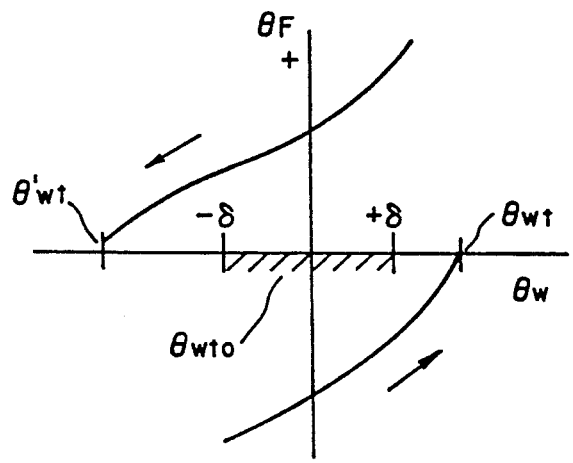
Figure 10:
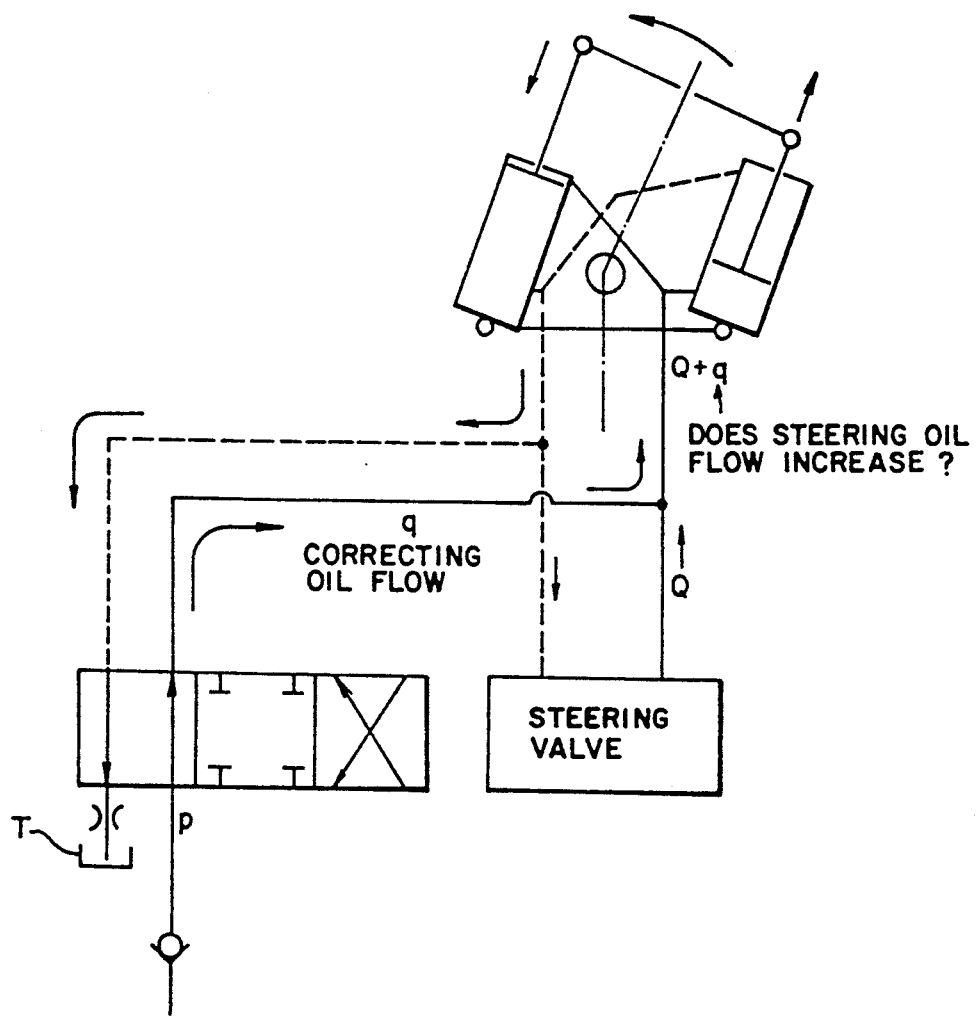
FIG. 10 is a view explaining that a turning direction of a wheel is the same as the correcting direction thereof (correcting oil is added to an oil flow from the steering valve to the steering cylinders)
Figure 11:
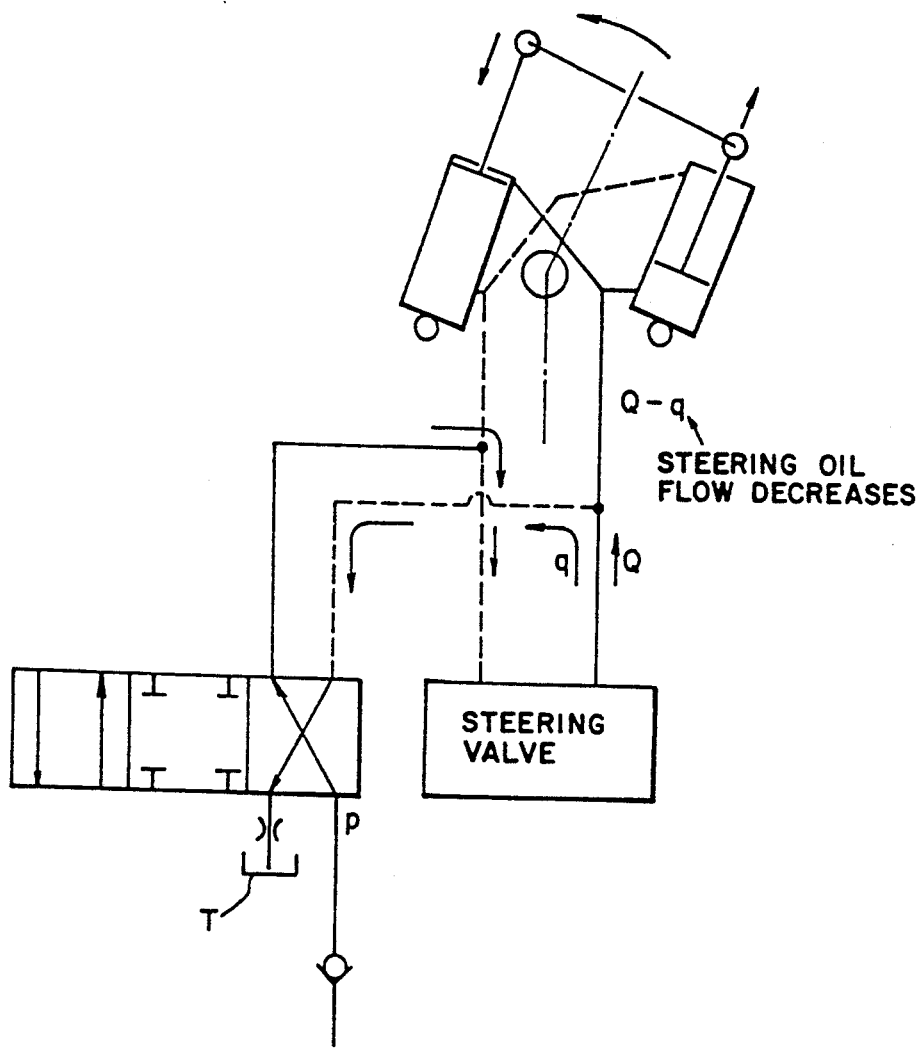
FIG. 11 is a view showing that the turning direction of the wheel is reversed to the correcting direction (part of the oil flow from the steering valve to the steering cylinders is drained)
Figure 12:
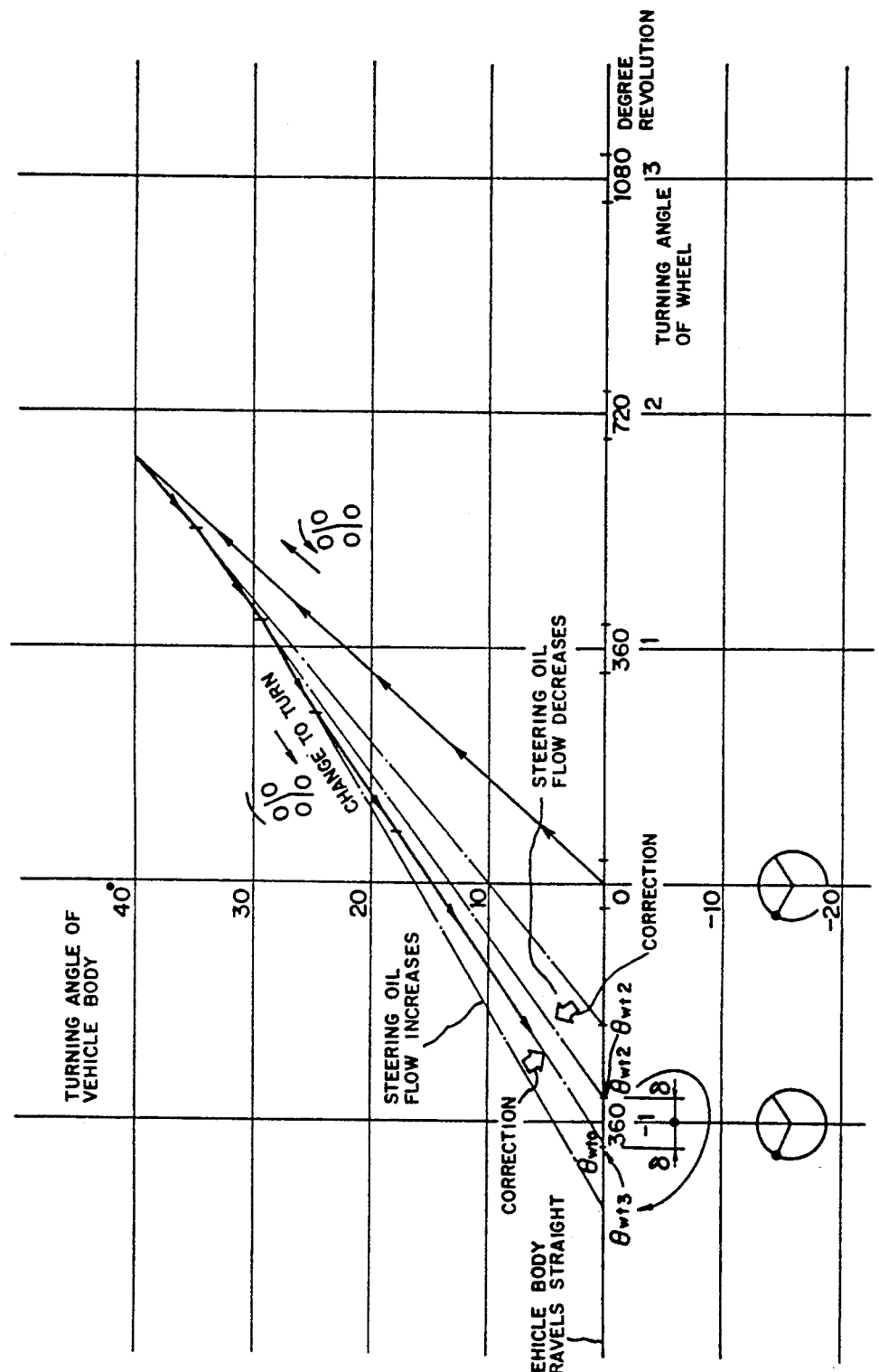
FIG. 12 is a schematic view showing the correction of changing to turn and FIG. 13 is a view showing a conventional pilot fully hydraulic steering system.

Step 13-2 (refer to FIG. 10). The wheel position correcting oil flow is merged with the steering oil flow through the wheel position correcting solenoid valve so that the amount of turning of the vehicle body is increased compared with the amount of changing to turn the wheel (the wheel is less turned compared with the amount of turning of the vehicle body) (refer to FIG. 8).

Figure 9:
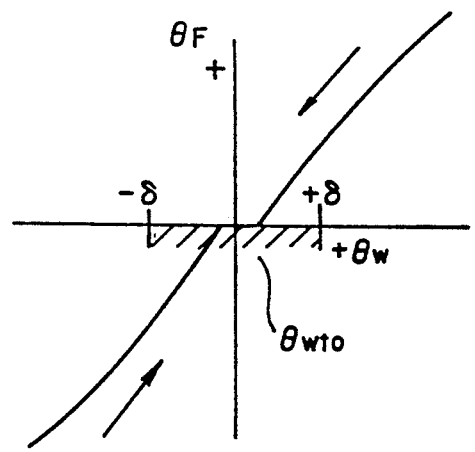

Step 13-3: Correction is not made (refer to FIG. 9).

Step 13-4: Correction is not made.

Figure 2:
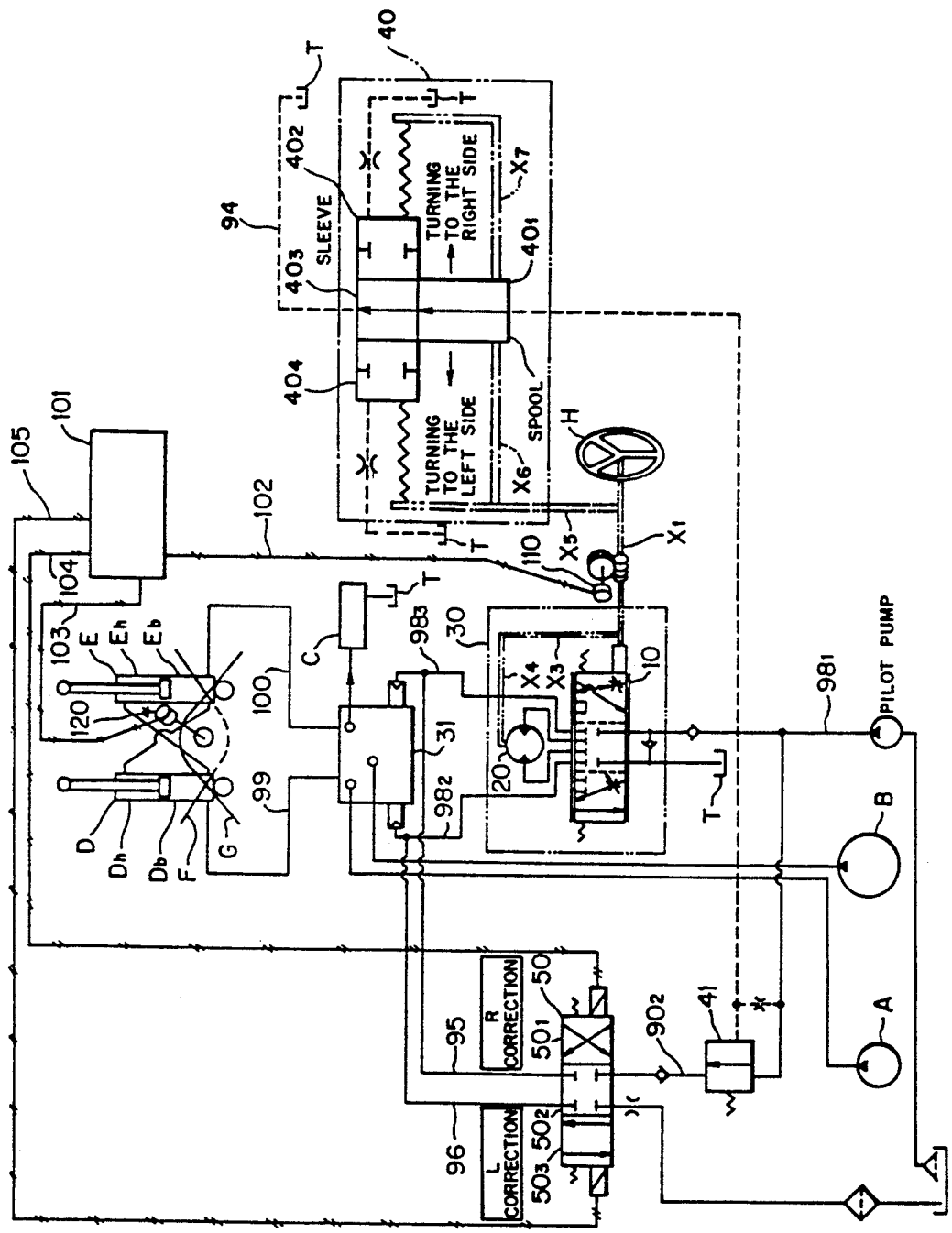
FIG. 2 is a view explaining the system according to another embodiment of the present invention, FIGS. 3(a) and (b) are flowcharts showing an operation of a controller.

An arrangement of the wheel position correcting device as shown in FIG. 2 is different from that of the embodiment as shown in FIG. 1, wherein the pilot type diverting valve 60 in FIG. 1 is replaced by the pilot type check valve 41 so that the correcting oil is supplied between the steering unit and the steering pilot port, thereby controlling the pilot oil. Accordingly, the wheel position correcting solenoid valve becomes compact so as to be adapted for the pilot type check valve through which small amount of oil flows with low pressure.

INDUSTRIAL UTILIZATION

As mentioned above, according to the present invention, it is possible to solve the problem in that the operation property of the wheel is deteriorated because of the gradual deviation of the wheel position during the straight traveling of the vehicle body. In case of frequent turning of the wheel rightward and leftward, it is possible to solve the problem in that the state where the wheel position is deviated lasts since the turning angle of the wheel is always compared with the turning angle of the vehicle body and corrected in accordance with the amount of deviation when the wheel position is deviated. Furthermore, the deviation correcting operation does not hinder the normal steering operation.

Since the correcting circuit closing valve is structured by the oil hole provided at the steering unit, there are such a prominent effect that an additional space is unnecessitated and the correcting circuit closing valve is made at low cost with high reliability.

Since the correcting circuit closing valve can mechanically control the amount of the correcting oil by the driver's steering operation, it is possible to prevent the correcting oil from supplying continuously into the steering cylinders and prevent the vehicle body from being spontaneously turned in case of trouble of the wheel position correcting valve.

We claim:

1. A fully hydraulic steering system for an articulated vehicle having wheeled front and rear frames coupled to each other by an articulating pin, said steering system including a steering unit operated by a steering wheel and operatively coupled to sidewardly disposed first and second hydraulic steering cylinders each having a first end coupled to said front frame and a second end coupled to said rear frame for articulating the front and rear frames relative to one another about the articulating pin, said steering system comprising:

a first sensor means for detecting a turning angle of the steering wheel;

a second sensor means for detecting an articulating angle between the front and rear frames of the vehicle;

a controller coupled to the first and second sensor means for comparing the outputs thereof, said controller including means for signalling when the articulating angle deviates from a predetermined value relative to the turning angle of the steering wheel;

a steering wheel position correcting valve means for supplying wheel position correcting oil to the first and second steering cylinders in response to said signalling means;

a steering flow control valve means for supplying main steering oil to the first and second steering cylinders in response to the steering unit;

a pilot-type diverting valve means for supplying hydraulic oil from a switch pump circuit to either the steering flow control valve means or the steering wheel position correcting valve means; and a correcting circuit closing valve means mechanically coupled to said steering unit for permitting said diverting valve means to supply the hydraulic oil to said steering wheel position correcting valve means only when said steering wheel is operated.

2. A fully hydraulic steering system as claimed in claim 1, wherein said correcting circuit closing valve means provides a path for draining a pilot oil from said pilot-type diverting valve means to a sump tank when said steering wheel is not being operated to prevent said pilot-type diverting valve means from supplying the hydraulic oil to said steering wheel position correcting valve means.

3. A fully hydraulic steering system as claimed in claim 1, wherein said correcting circuit closing valve means blocks a path for draining a pilot oil from said pilot-type diverting valve means to a sump tank when said steering wheel is being operated to permit said pilot-type diverting valve means to supply the hydraulic oil to said steering wheel position correcting valve means.

* * * * *